(12) United States Patent
Saminathan et al.

(10) Patent No.: US 6,765,079 B2
(45) Date of Patent: Jul. 20, 2004

(54) LIQUID CRYSTALLINE POLYMER FILMS OF POLYMERS OF HAVING AZOBENZENE MESOGENIC GROUPS IN CROSS LINKED NETWORK STRUCTURES, PROCESS FOR THE PREPARATION THEREOF, POLYMERS AND NOVEL MONOMERS HAVING AZOBENZENE MESOGENS

(75) Inventors: Muthusamy Saminathan, Kerala (IN); Chennakkattu Krishna Sadasivan Pillai, Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/395,937

(22) Filed: Mar. 24, 2003

(65) Prior Publication Data

US 2003/0181618 A1 Sep. 25, 2003

Related U.S. Application Data

(62) Division of application No. 10/212,589, filed on Aug. 5, 2002, which is a division of application No. 09/538,642, filed on Mar. 30, 2000, now abandoned.

(51) Int. Cl.[7] .............................................. C08F 222/26
(52) U.S. Cl. ...................... 526/322; 564/330; 564/331; 534/558; 534/649; 568/629; 568/630; 526/318.1; 526/326; 526/327; 526/330; 526/334
(58) Field of Search ............................. 526/322, 318.1, 526/326, 327, 330, 334; 564/330, 331; 534/558, 649; 568/629, 630

(56) References Cited

U.S. PATENT DOCUMENTS

| | | | |
|---|---|---|---|
| 2,317,585 A | * | 4/1943 | Caplan ........................ 568/780 |
| 2,502,436 A | | 7/1950 | Dawson et al. |
| 2,496,151 A | | 8/1950 | Dawson et al. |
| 2,571,091 A | | 8/1951 | Wasserman et al. |
| 6,229,054 B1 | | 5/2001 | Dai et al. .................... 568/630 |

FOREIGN PATENT DOCUMENTS

GB       662509       8/1949

OTHER PUBLICATIONS

Macromolecules (1993), 26(25), 7103–5 (Author Saminathan, Muthusamy et al.) "Synthesis and Characterization of Main–Chain Liquid Crystaline Polymers Containing a p–Phenyleneazo Group".

Macromol. New Front., Proc.IUPAC Int.Symp.Adv.Polym.Sci.Technol. (1998), vol. 1, 256–259 (Author Saminathan M. et al) "Liquid crystal side chain polymers with azobenzene mesogen".

* cited by examiner

*Primary Examiner*—Tatyana Zalukaeva
(74) *Attorney, Agent, or Firm*—Ladas & Parry

(57) ABSTRACT

Novel cross linked polymer films prepared from poly4-[(4-cardanylazo]benzoic acid and poly4-[(4-acryloylcardanylazo]benzoic acid are disclosed. The invention also relates to novel monomers 4-[(4-cardanylazo] benzoic acid and 4-[(4-acryloylcardanylazo] benzoic acid and polymers thereof as well processes for the preparation thereof.

4 Claims, No Drawings

LIQUID CRYSTALLINE POLYMER FILMS OF POLYMERS OF HAVING AZOBENZENE MESOGENIC GROUPS IN CROSS LINKED NETWORK STRUCTURES, PROCESS FOR THE PREPARATION THEREOF, POLYMERS AND NOVEL MONOMERS HAVING AZOBENZENE MESOGENS

This Application is divisional of application Ser. No. 10/212,589 filed Aug. 5, 2002, which is a division of Ser. No. 09/538,642 filed Mar. 30, 2000 now abandoned.

FIELD OF THE INVENTION

The present invention relates to liquid crystalline polymer films prepared from polymers of novel monomers having azobenzene mesogenic groups and supported in cross linked network structures. The present invention also relates to processes for the preparation of such polymer films. The present invention also relates to polymers of novel monomers having azobenzene mesogenic groups and processes for the preparation thereof, and to polymers prepared from such novel monomers. More particularly, the present invention relates to processes for the preparation of 4-[(4-cardanyl) azo] benzoic acid and its acryloyl derivative 4-[(4-acryloylcardanyl) azo] benzoic acid and their respective polymers poly 4-[(4-cardanyl) azo] benzoic acid and poly 4-[(4-acryloylcardanyl) azo] benzoic acid and includes a process for the cationic polymerisation of 4-[(4-cardanyl) azo] benzoic acid.

4-[(4-cardanyl azo] benzoic acid and 4-[(4-acryloylcardanyl azo] benzoic acid of formulae I and II are novel monomers having azobenzene mesogen. Poly 4-[(4-cardanyl) azo] benzoic acid and poly 4-[(4-acryloylcardanyl) azo] benzoic acid of formulae III and IV are their respective liquid crystalline polymers having azobenzene mesogen supported in a cross linked network structure. The cationic polymerisation of 4-[(4-cardanyl) azo] benzoic acid also gives rise to another liquid crystalline polymer of formula V. These compounds are prepared from inexpensive naturally occurring materials such as cashew nut shell liquid and its distillation product cardanol.

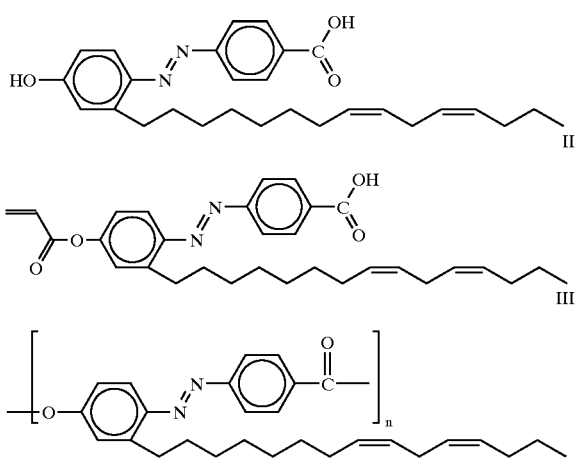

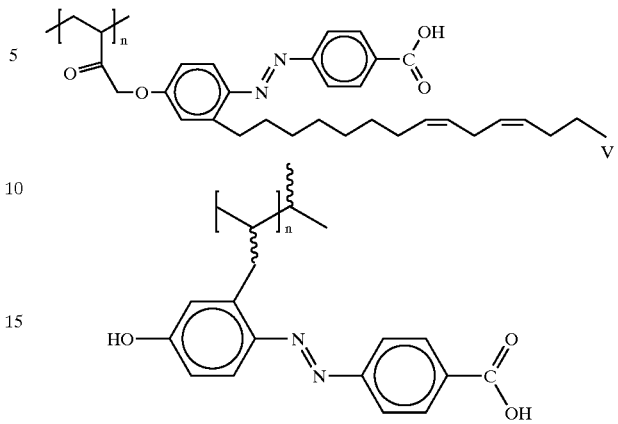

BACKGROUND OF THE INVENTION

Liquid crystalline (LC) polymers with cross linked networks are becoming attractive due to possibilities for freezing the LC phase (Shiota, A. and Ober, C. K. *Prog. Polym. Sci.*, 1997, 22, 975; Morman, W. and Zimmermann, J. G., *Macromolecules*, 1996, 29, 1949; Morman, W., *Trends in Polymer Science*, 1995, 2(8), 2559; Koner, H. And Ober, C. K., *Polym. Mater. Sci.Eng. Prepr.*, 1995, 73, 456; Morman, W. and Zimmermann, J. G., *Macromol. Symp.*, 1995, 93,96; Wang, Y. H., Hong, H. L., Yang, F. S. and Hong, I. L., *Polym. Mater. Sci.Eng. Prepr.*, 1994, 71, 678; Melissaris, A. P., Sutter, J. K., Litt, M. H, Scheiman, D. A. and Scheiman, M., *Macromolecules*, 1995, 28, 860; Hoyt, A. E. and Huang, S. J. *J. Macromol. Sci.: Pure Appl. Chem.*, 1995, A32,1931; Hikmet, R. A. M., Lub, J. and Tol, A. J. W., *Macromolecules*, 1995, 28, 3313; Lai, W. W. and Chang, T. C., *J. Polym. Sci., Polym. Chem. Ed.*, 1995, 33, 1075; Douglas, E. P., Langlois, D. A. and Benicewice, B. C., *Chem. Mater.*, 1994, 6,1295; Mallon, J. J. and Adams, P. M. *J. Polym. Sci., Polym. Chem. Ed.*, 1993, 31, 2249; Barclay, G. G. and Ober, C. K., *Prog. Polym. Sci.*, 1993, 18, 899; Navarro, F., *Macromolecules*, 1991, 24, 6622; Peter, K. and Ratzsch, M., *Macromol. Chem.*, 1990, 191, 1021; Taroze, R. V., Gubina, T. I., Shibaev, V. P., Plate, N. A., Pakin, V. I., Shamakova, N. A. and Shukov, F., *Macromol. Chem. Rapid Commun.*, 1990, 11, 67; Mitchel, G. R., Davis, F. J. and Ashman, *Polymer*, 1987, 28, 639: Zentel, R. and Reckert, G., *Macromol. Chem.*, 1986, 187, 1915; Finkelmann, H., Kock H. J. and Rehage, G., *Macromol. Chem. Rapid Commun.*, 1981, 2, 317; Percec, V. (Ed), Liquid Crystalline Polymers, Parts 1–4, *Prog. Polym. Sci.*, 1997, 22). These cross linked polymers pass through a mesophase during curing and retain a mesophase in the final state (Shiota, A. and Ober, C. K. *Prog. Polym. Sci.*, 1997, 22, 975). By combining the ability to lock in an ordered network structure with the ability to macroscopically align the network, these materials can be used for preparation of films and bulk materials where highly ordered structures can be obtained. LC main chain/side chain polymers with cross linked networks can be prepared by chemical/thermal/photo-cross linking of reactive double bonds in the chain or by reaction with a cross linking agent or by copolymerisation (Morman, W. and Zimmermann, J. G., *Macromolecules*, 1996, 29, 1949; Koner, H. And Ober, C. K., *Polym. Mater. Sci.Eng. Prepr.*, 1995, 73, 456; Wang, Y. H., Hong, H. L., Yang, F. S. and Hong, I. L., *Polym. Mater. Sci. Eng. Prepr.*, 1994, 71, 678). Thus, investigations on a number of rigid rod liquid crystalline thermosets such as blacetylene rigid rod thermosets (Shiota, A. and Ober, C. K., *Prog. Polym. Sci.,* 1997, 22, 975; Melissaris, A. P., Sutter, J. K., Litt, M. H., Scheiman, D. A. and Scheiman, M., *Macromolecules,* 1995, 28, 860; Douglas, E. P., Langlois, D. A. and Benicewice, B. C., *Chem. Mater.,* 1994, 6, 1295), cyanate ester rigid rod thermosets (Barclay, G. G. and Ober, C. K., *Prog. Polym. Sci.,* 1993, 18, 899), rigid rod epoxy thermosets (Carfagna, C., Amendola, E., Giaberini, M., Filiprov, A. G. and Bauer, R. S., *Liq. Cryst,* 1993, 13, 571; Dhein, R., Meier, H.-M., Muller, H.-P. And Gipp, R., German Offen 3622613, A1, 1988; Earls, J. D. and Hefner, R. E., Jr., Eur. Patent Appl. 379057, A2, 1990; Hefner, R. E., Jr. and Earls, J. D., Eur. Patent Appl. 475238, A2, 1992; Eirchmeyer, S., Muller, H.-P. and Karbach, A., Eur. Patent Appl. 445401, A2, 1991), bismaleimide rigid rod thermosets (Hoyt, A. E. and Huang, S. J. *J. Macromol. Sci.: Pure Appl Chem.,* 1995, A32, 1931) and semirigid rod liquid crystalline thermosets (Shiota, A. and Ober, C. K. *Prog. Polym. Sci.,* 1997, 22, 975; Hikmet, R. A. M., Lub, J. and Tol, A. J. W., *Macromolecules,* 1995, 28, 331) were reported. All these polymers employ the conventional networking using a multiple epoxy grouping or a diacetylene moiety or diacrylate moiety. No report on the formation of cross link through a side chain containing multiple double bonds could be found in patent literature or publications on cross linked liquid crystalline polymers. However, the side chain of cardanyl acrylate has been reported to be used in cross link formation in poly(cardanyl acrylate) which is not liquid crystalline (John, G. and Pillal, C. K. S., *Macromol. Chem. Rapid Commun.* 1992, 13, 255; John, G. and Pillal, C. K. S., *J. Polym. Sci,Polym. Chem.,* 1993, 31, 1069; Pillal, C. K. S., in *Handbook of Engineering Polymeric Materails,* (Ed) N. P. Cheremisinoff, Marcel Dekker, New York (1997). Cardanol is a naturally occurring material and hence is inexpensive. The formation of the cross-linked polymer has been explained as due to the autocross linking of the unsaturated side chain of cardanyl unit (John, G. and Pillai, C. K. S., *J. Polym. Sci,Polym. Chem.,* 1993, 31, 1069). This property of the cardanyl side chain can be used to form cross linked network structures for liquid crystalline polymers. Cardanol was shown to possess special structural features that allow it to be transformed into high performance polymers including liquid crystalline polymers (Pillal, C. K. S., Sherrington, D. C. and Sneddon, A., *Polymer,* 1992, 33, 3968; Saminathan, M., Pillai, C. K. S. and Pavithran, C., *Macromolecules,* 1993, 265 7103; Pillal, C. K. S., Sherrington, D. C. and Sneddon, Indian Patent Application No. 679/Del/92 dated Jul. 29, 1992; Saminathan, M. Pillal, C. K. S. and Pavithran, Indian Patent Application No. 2791/Del/92 dated Dec. 31 1992; Saminathan, M. , Pillal, C. K. S. and Pavithran, Indian Patent application No. 2972/Del/92 dated Dec. 31, 1992. In an earlier patent (Saminathan, M., Pillal, C. K. S. and Pavithran, C., Indian Patent Application No.2972/Del/92 dated Dec. 31, 1992), it was shown that a liquid crystalline polymer, poly[4-[hydroxy-2-pentadecyl)azo]benzoic acid] can be prepared from 3-n-pentadecyl phenol, the hydrogenated derivative of cardanol and that this polymer is potentially a non-linear optical (NLO) material (Saminathan, M., Pillai, C. K. S. and Pavithran, C., *Macromolecules,* 1993, 26, 7103). Azobenzene derivatives and polymers containing donor-acceptor groups in conjugation are known for their NLO activity (Sudesh Kumar, G., *AZO Functional Polymers: Functional Group Approach in Macromolecular Design,* Technomic Publication, Lancaster 1992; Sutherland, R. L., *Handbook of Nonlinear Optics,* Marcer Dekker, New York, 1996 and I-C. Khoo, F. Simoni, and C. Umeton, *Novel Optical Materials and Applications,* Wiley-VCH Publications, Weinheim, Germany, 1996). To retain the NLO property in a polymer, it is, however, important to prevent the dipole reversal or relaxation from their dipolar alignment. One of the methods recommended to arrest the relaxation is by introducing cross links during polling which "lock in" dipole alignment due to the restricted molecular mobility.

Azobenzene derivatives and polymers containing donor-acceptor groups in conjugation are known for their non-linear optical activity. To retain the non-linear optical property in a polymer, it is, however, important to prevent the dipole reversal or relaxation from their dipolar alignment. One of the methods recommended to arrest the relaxation is by introducing cross links during polling which "lock in" dipole alignment due to the restricted molecular mobility.

It is therefore important to obtain azobenzene derivatives capable of providing polymers which have non-linear optical activity.

OBJECTS OF THE INVENTION

The main object of the invention is to provide liquid crystalline polymer films and processes for the preparation thereof wherein the films are made of polymers with non-linear optical activity.

It is another object of the invention to provide novel monomers containing azobenzene mesogens and liquid crystalline polymers containing azobenzene mesogenic moieties supported in a cross linked network structures using a $C_{15}H_{27}$ hydrocarbon substituent with multiple double bonds suitable for making liquid crystalline polymer films.

It is another object of the invention to provide processes to prepare novel monomers containing azobenzene mesogens and liquid crystalline polymers and polymer films containing azobenzene mesogenic moieties supported in a cross linked network structures using a $C_{15}H_{27}$ hydrocarbon substituent with multiple double bonds.

It is another object of the invention to provide processes for the preparation of novel monomers containing azobenzene mesogens making use of a natural material, cardanol, which is cost effective.

It is a further object of the invention to overcome the problem of high cost of prior art monomers used to prepare liquid crystalline polymers.

It is another object of the invention to provide a process for the preparation of novel monomers containing azobenzene mesogen and polymers and polymer films thereof wherein the formation of cross links can also be controlled by controlling the rate of heating of the polymers.

SUMMARY OF THE INVENTION

The present invention relates to a process for the preparation of 4-[(4-cardanyl)azo]benzoic acid and 4-[(4acryloylcardanyl)azo]benzoic acid and their polymers poly4-[(4-cardanyl)azo]benzoic acid and poly 4-[(4-acryloylcardanyl)azo] benzoic acid. The present invention also provides a process for the cationic polymerisation of 4-[(4-cardanyl)azo]benzoic acid.

Accordingly, the present invention provides a process for the preparation of cross linked films of poly4-[(4-cardanyl)azo]benzoic acid and poly 4-[(4-acryloylcardanyl)azo] benzoic acid, comprising dissolving the polymer in a conventional organic solvent, evaporating the solvent, raising the temperature to 150–180° C., annealing the polymers to obtain cross linked films exhibiting liquid crystalline phase behaviour.

In one embodiment of the invention, the solvent is selected from the group comprising of tetrahydrofuran, dimethyl acetamide, dimethyl form amide.

In another embodiment of the invention, the polymers are heated at a uniform heat rate of 5–10° C. per minute to the desired temperature range.

In a further embodiment of the invention, the polymers are annealed at a temperature in the range of 150–180° C. for 1 to 2 hours to obtain the fully cross linked polymer networks exhibiting liquid crystalline phase behaviour.

The invention also relates to novel monomers extracted from cardanol having azobenzene mesogens selected from 4-[(4-cardanyl)azo]benzoic acid and its acryloyl derivative 4-[(4acryloylcardanyl)azo]benzoic acid.

The invention also relates to a process for the preparation of 4-[(4-cardanyl)azo]benzoic acid and its acryloyl derivative 4-[(4acryloylcardanyl)azo] benzoic acid, said process comprising diazotising p-amino benzoic acid by any known method, adding a solution of cardanol in an organic solvent drop wise to the diazonium salt solution and crystallising it from an organic solvent to obtain 4-[(4-cardanyl)azo] benzoic acid, and if desired converting the said 4-[(4-cardanyl)azo]benzoic acid obtained to its acryloyl derivative and 4-[(4acryloylcardanyl)azo]benzoic acid by any known method.

In one embodiment of the invention, the diazotisation is effected using sodium nitrate in dilute hydrochloric acid at a temperature in the range of 0–5° C.

In another embodiment of the invention, the ratio of p-amino benzoic acid and cardanol used is 1:1.

In a further embodiment of the invention, 4-[(4-cardanyl) azo]benzoic acid is converted to its acryloyl derivative 4-[(4acryloylcardanyl)azo]benzoic acid by reacting the monomer with acryloyl chloride.

The invention also relates to a process for the polymerisation of the novel monomers above, said process comprising subjecting the said novel monomers to one of polycondensation, free radical polymerisation or cationic polymerisation.

The invention also relates to a process for the preparation of poly4-[(4-cardanyl)azo]benzoic acid comprising subjecting 4-[(4-cardanyl)azo]benzoic acid to polymerisation by any known polycondensation technique using thionyl chloride and pyridine.

In one embodiment of the invention, the process for the preparation of poly4-[(4-acryloylcardanyl)azo] benzoic acid comprises subjecting 4-[(4-acryloylcardanyl)azo]benzoic acid to polymerisation by any known free radical polymerisation technique.

Another embodiment of the invention provides a process for the preparation of the cationic polymer of formula V of 4-[(4-cardanyl)azo]benzoic acid by subjecting the monomer to polymerisation by cationic mechanism in the presence of borontrifluoroetherate in dichloroethane at 100° C. to obtain the said cationic polymer polymerised through the side chain unsaturation.

The invention also relates to novel polymers poly4-[(4-cardanyl)azo]benzoic acid and poly4-[(4-acryloylcardanyl) azo]benzoic acid of 4-[(4-cardanyl)azo]benzoic acid and its acryloyl derivative respectively, having azobenzene mesogens in network structures and the cationic polymer of formula V of 4-[(4-cardanyl)azo]benzoic acid, said cationic polymer being polymerised through the side chain unsaturation.

The invention also relates to a process for forming polymer films ahving azobenzene mesogens in crosslinked network structures comprising (a) diazotizing p-amino benzoic acid by known methods, adding a solution of cardanol in an organic solvent drop wise to the diazonium salt solution and crystallising 4-[(4-cardanylazo]benzoic acid so obtained from an organic solvent, (b) polymerising the novel monomer 4-[(4-cardanylazo]benzoic acid by known polycondensation technique using thionyl chloride and pyridine to give poly4-[(4-cardanylazo]benzoic acid or (c) reacting 4-[(4-cardanylazo]benzoic acid with acryloyl chloride to get the acryloyl derivative 4-[(4acryloylcardanyl)azo]benzoic acid, polymerising said acryloyl derivative by known free radical polymerisation technique to give poly4-[(4-acryloylcardanyl)azo] benzoic acid, or (d) polymerising the said 4-[(4-cardanyl)azo]benzoic acid by cationic mechanism using borontrifluoroetherate in dichloroethane at 100° C. to get the cationic polymer of 4-[(4-cardanyl)azo]benzoic acid polymerised through the side chain unsaturation, (e) cross linking the polymers obtained above by controlled heating at a rate of 5–10° C. per minute to a temperature of 150–180° C. and annealing at this temperature for 1–2 hours and (f) dissolving the polymer prior to cross linking in solvents selected from tetrahydrofuran, dimethyl acetamide, dimethyl formamide and evaporating the solvent off by exposing the glass plate in a vacuum oven and raising the temperature to 150–180° C. and annealing at this temperature for 1–1½ hours to obtain cross linked films thereof exhibiting liquid crystalline phase behaviour.

In one embodiment the invention relates to a process for the preparation of 4-[(4-cardanyl)azo]benzoic acid and 4-[(4acryloylcardanyl)azo]benzoic acid and their polymers poly 4-[(4-cardanyl)azo] benzoic acid and poly4-[(4-acryloylcardanyl)azo] benzoic acid including a process for the cationic polymerisation of 4-[(4-cardanyl)azo]benzoic acid comprising (a) diazotising p-amino benzoic acid by known methods, adding a solution of cardanol in an organic solvent drop wise to the diazonium salt solution and crystallising it from an organic solvent, polymerising the novel monomer 4-[(4-cardanyl)azo]benzoic acid thus obtained by known polycondensation technique using thionyl chloride and pyridine to give poly4-[(4-cardanyl)azo]benzoic acid, (b) reacting 4-[(4-cardanyl)azo]benzoic acid with acryloyl chloride to get the acrylic derivative 4-[(4acryloylcardanyl) azo]benzoic acid, (c) polymerising said acryloyl derivative by known free radical polymerisation technique to give poly4-[(4-acryloylcardanyl)azo]benzoic acid or (d) polymerising 4-[(4-cardanyl)azo] benzoic acid by cationic mechanism using borontrifluoroetherate in dichloroethane at 100° C. to get the cationic polymer of 4-[(4-cardanyl)azo] benzoic acid polymerised through the side chain unsaturation (e) and if desired converting the polymers obtained above to cross linked polymer films with azobenzene mesogens in network structures by cross linking the polymers under controlled heating at a rate of 5–10° C. per minute to a temperature of 150–180° C. and annealing at this temperature for 1–2 hours and (f) dissolving the polymer in solvents selected from tetrahydrofuran, dimethyl acetamide, dimethyl formamide and evaporating the solvent off by exposing the glass plate in a vacuum oven and raising the temperature to 150–180° C. and annealing at this temperature for 1–1½ hours whereby cross linked films exhibiting liquid crystalline phase behaviour.

In one embodiment of this invention, the monomer prepared is converted to its acryloyl derivative by any known method.

In one embodiment of this invention, the novel monomers prepared are 4-[(4-cardanyl)azo]benzoic acid and 4-[(4acryloylcardanyl)azo]benzoic acid.

The invention also provides a process for the preparation of polymers of the novel monomers containing azobenzene mesogens In one embodiment of this invention, the polymerisation is done by (1) polymerising the monomer 4-[(4-cardanyl)azo]benzoic acid by known polycondensation technique using thionyl chloride and pyridine to give poly4-[(4-cardanyl)azo]benzoic acid, (2) reacting 4-[(4cardanyl)azo]benzoic acid with acryloyl chloride to get the novel monomer 4-[(4acryloylcardanyl)azo]benzoic acid, polymerising it by known free radical polymerisation technique to give poly4-[(4-acryloylcardanyl)azo]benzoic acid, or by (3) polymerising 4-[(4-cardanyl)azo]benzoic acid by cationic mechanism using borontrifluoroetherate in dichloroethane at 100° C. to get the cationic polymer of 4-[(4-cardanyl)azo] benzoic acid polymerised through the side chain unsaturation.

DETAILED DESCRIPTION OF THE INVENTION

The processes of the present Invention describe the formation of network structures through cross link formation using multiple double bonds of a $C_{15}H_{27}$ side chain attached to the mesogenic moiety. This is the first time such cross link formation has been achieved through multiple double bonds of a hydrocarbon side chain for freezing the liquid crystalline phase. In a net work structure.

The invention is based on the finding that cardanol undergoes diazo coupling reaction to produce monomers containing mesogenic azobenzene moiety to which a $C_{15}H_{27}$ hydrocarbon moiety with multiple double bonds is, attached. The monomers 4-[(4-cardanyl)azo]benzoic acid can be polymerised by condensation polymerisation to give the polymer and its acryloyl derivative 4-[(4acryloylcardanyl)azo]benzoic acid can undergo condensation polymerisation to give poly4-[(4-cardanyl)azo]benzoic acid which exhibits liquid crystalline phase when fully cross linked through the multiple double bonds of the long alkenyl side chain. 4-[(4-acryloylcardanyl)azo]benzoic acid, the acryloyl derivative of the monomer 4-[(4cardanyl)azo]benzoic acid undergoes addition polymerisation through the acrylate double bond and gives a liquid crystalline phase supported in cross linked network structures. 4-[(4-cardanyl)azo]benzoic acid also can be polymerised by cationic mechanisms using boron trifluoroetharate to give a liquid crystalline polymer wherein polymerisation as well as cross linking takes place through the unsaturated side chain.

The diazotisation reaction is carried out preferably by using sodium nitrate in dilute acid medium at a temperature in the range 0–5° C. The acryloylation is carried out by adding acryloyl chloride in drops to cold potassium salt in dimethyl acetate solution with stirring. The solution was poured into ice water after stirring for 1 hour. Condensation polymerisation of 4-[(4acryloylcardanyl)azo]benzoic acid was carried out using thionyl chloride and pyridine and free radical polymerisation of 4-[(4acryloylcardanyl)azo]benzoic acid was carried out using benzoyl peroxide in solvent medium of o-dichlorobenzene. On slow heating under controlled heating rate of 5–10° C., all the polymers get converted to fully cross linked products. While the polymer poly4-[(4-cardanyl)azo]benzoic acid of formula III gave a nematic phase with threaded texture under crossed polarised light microscope, the polymer, poly4-[(4-acryloylcardanylazo]benzoic acid of formula IV and the cationic polymer of formula V exhibited nematic phases with schlieren textures when viewed under the polarised light microscope. All the polymers get converted to fully cross linked products on controlled heating to 150–180° C. at a heating rate of 5–10° minute and then annealing at this temperature for a further period of 1–2 hours. The significance of these polymers lies in their capability to be cast into a film from a suitable solution and later thermally converted to an insoluble transparent film that retains the LC phase. It should be noted that these polymers can not be compared to rigid rods thermosets because the cross linking in this case is developed from an unsaturated hydrocarbon side chain. Because of the same reason, it also differs from the semi rigid rod diacrylates with densely cross linked LC network structures or the semi rigid rod diacrylates with loosely cross linked anisotropic gels. So, this is the first of the kind of net work developed through a side chain containing unsaturation. When observed under polarised light microscope poly4-[(4-cardanyl)azo]benzoic acid did not show melting initially to form a mesophase, but, the polymer sample prepared by rapid melting and quenching to room temperature within a few seconds showed threaded nematic texture. This is a typical case of stabilisation of the mesophase through the long alkyl side chain. As the side chain in the present case is unsaturated, it undergoes cross linking to give three dimensional network structure without affecting the LC behaviour. In contrast to the behaviour of polymer poly4-[(4-cardanyl)azo]benzoic acid, the polymer poly4-[(4-acryloylcardanyl)azo]benzoic acid melted at 153° C. exhibiting a clear schileren texture characteristic of nematic phase. These findings were confirmed by differential scanning calorimetry. The cationically polymerised product from 4-[(4-cardanyl)azo]benzoic acid also exhibited a crystal to mesophase transition at 134° C. in differential scanning calorimetry which was confirmed by the polarised light microscopy. The total insolubility of the fully cross linked products and the absence of the absorption of double bonds in the infra red spectra of the polymers indicated that they are fully cross linked. The solution casting was carried out in highly polar solvents such as tetrahydrofuran, dimethyl acetamide, dimethyl formamide etc. and the cross linking reaction was either maniupulated simultaneously during polymerisation by control of reaction parameters or by direct heating of the polymer/film in oxygen under controlled conditions at a temperature in the range of 150–160° C.

The present invention has many advantages over the existing processes/products. The existing products/process are those for the preparation of liquid crystalline thermoset diacetylenes, thermoset epoxies, thermoset semi rigid polymers etc(Shiota, A. and Ober, C. K., *Prog. Polym. Sci.,* 1997, 22, 975; Melissaris, A. P., Sutter, J. K., Litt, M. H., Scheiman, D. A. and Scheiman, M., *Macromolecules,* 1995, 28, 860; Douglas, E. P., Langlois, D. A. and Benicewice, B. C., *Chem. Mater.,* 1994, 6, 1295; Barclay, G. G. and Ober, C. K., *Prog. Polym. Sci.,* 1993, 18, 899; Carfagna, C., Amendola, E., Glaberini, M., Filiprov, A. G. and Bauer, R. S., *Liq. Cryst.,* 1993, 13, 571; Dhein, R., Meier, H.-M, Muller, H.-P. And Gipp, R., German Offen 3622613, A1, 1988; Earls, J. D. and Hefner, R. E., Jr., Eur. Patent Appl. 379057, A2, 1990; Hefner, R. E., Jr. and Earls, J. D., Eur. Patent Appl. 475238, A2, 1992; Eirchmeyer, S., Muller, H.-P. and Karbach, A., Eur. Patent Appl. 445401, A2, 1991; Hoyt, A. E. and Huang, S. J. *J. Macromol. Sci.: Pure Appl. Chem.,* 1995, A32,1931; Shiota, A. and Ober, C. K. *Prog. Polym. Sci.,* 1997, 22, 975; Hikmet, R. A. M., Lub, J. and Tol, A. J. W., *Macromolecules,* 1995, 28, 331). All the above prior art polymers employ conventional networking using a multiple epoxy grouping or a diacetylene moiety or diacrylate moiety. No report on the formation of cross link through a side chain containing multiple double bonds could be found in patent literature or publications on cross linked liquid crystalline polymers. For the first time, cross linked polymers with liquid crystalline property have been prepared using a side chain containing multiple double bonds through which the cross linking has been achieved. This is also the first time that an azobenzene mesogen has been shown to exhibit liquid crystalline behaviour under network structures. The processes/products of liquid crystalline polymers having cross linked structures hitherto reported contain functional moieties such as epoxy, diacetylene, dicrylate etc. and not azobenzene mesogen. The processes of the present invention also make use of a natural material, cardanol which is cost effective and the problem of high cost of monomers used in liquid crystalline polymers can be overcome. The formation of cross links can also be controlled by controlling the rate of heating of the polymers. The cross link formation can be manipulated either during polymerisation by judiciously controlling the optimised parameters or directly heating the polymer/film after polymerisation in controlled conditions of time, temperature and rate of heating. So, polymers with fully cross linked net work structures to partially cross linked structures can be obtained. At the partially cross linked state, the polymers are soluble in certain solvents from which films can be cast and then by heating the film fully cross linked films could be prepared without affecting the liquid crystalline phase behaviour. Such control over film preparation has been achieved for the first time.

The polymers of the invention contain network structures wherein the liquid crystalline phases are freezed. These are novel liquid crystalline polymers with cross linked network structures containing azobenzene mesogen based on cardanol, the unsaturated $C_{15}$ hydrocarbon side chain of which is utilised for cross linking reactions. These liquid crystalline polymers having network structures containing azobenzene mesogen might find applications in imaging technology, electro-optical devices, advanced adhesives, new matrix materials for composites, thermosets for non-linear optics, liquid crystalline networks for polarizers etc. and hence the industries to which these invention belong are microelectronics industries, aero-space industries, polymer industries etc.

4-[(4-cardanyl) azo] benzoic acid and 4-[(4-acryloylcardanyl) azo] benzoic acid are bifunctional monomers possessing azobenzene mesogenic moieties and can be used as sources for the production of liquid crystalline homo and copolymers. Additionally, as the azobenzene mesogenic moiety contains an unsaturated substituent of length equivalent to 15 carbon atoms having multiple double bonds, their polymers can be designed to have cross linked structures wherein the liquid crystalline phase gets freezed giving rise opportunities for application in electro-optical devices. The polymers poly 4-[(4-cardanyl) azo] benzoic acid and poly 4-[(4-acryloylcardanyl) azo] benzoic acid including a process for the cationic polymerisation of 4-[(4-cardanyl) azo] benzoic acid of the formula I could find applications as a speciality plastic/fibre/film in imaging technology, electro-optical devices etc. One of the significant features of its structures of the compound prepared by the process of the present invention is that it has a flexible n-alkenyl substituent ($-C_{15}H_{27}$) and rigid azo group built into the same molecule. The rigid azo group can also give rise to application of polymer in non-linear optics (NLO) by appropriate chemical modifications.

The invention is described with reference to the examples given below which are by way of illustration only and should not be construed to limit the scope of the invention.

EXAMPLE 1

ρ-Aminobenzoic acid (68.5 g) was dissolved in dilute hydrochloric acid and diazotised with sodium nitrite (34.5 g in 100 mL of water) solution at 0° C. with stirring. Cardanol (150.2 g) dissolved in a chilled solution of potassium hydroxide (53.9 g) in methanol (500 mL was added dropwise to the above solution diluted with chilled methanol (1600 mL). The red dye formed was stirred for a further 2 h and poured into a dilute hydrochloric acid solution with stirring. The red solid separated was filtered, washed thoroughly with water, and dried. The product was then purified by column chromatography on silica gel (100–200 mesh) using chloroform as eluent. Solvent was removed and recrystallized from a methanol-water mixture to get 4-[(4-cardanylazo]benzoic acid (80% yield) as red flakes with melting points in the range of 134–135° C.

EXAMPLE 2

Acryloyl chloride (2.05 g) was added in drops to cold potassium salt of 4-[(4-cardanylazo]benzoic acid (5 g) in dimethyl acetamide solution with stirring. The solution was poured into ice water (2000 mL after stirring for 1 h. The precipitated product was filtered and washed thoroughly with cold water, then dissolved in ether, dried using anhydrous sodium sulphate and filtered. Ether was removed under reduced pressure and the product was chromatographed on silica gel (100–200 mesh) using chloroform as eluent. Chloroform was removed under reduced pressure to get 4-[(4-acryloyloxycardanyl)azo]benzoic acid with an yield of 80% as red solid with melting points in the range of 118–120° C.

EXAMPLE 3

The monomer, 4-[(4-cardanylazo]benzoic acid (5.0 g) was refluxed (1 hour) with an excess of thionyl chloride (5 ml) in a two necked round bottom flask attached with a condenser and a gas purge tube and the excess thionyl chloride was distilled off in a nitrogen stream. o-Dichlorobenzene was added to dissolve the acid chloride and a few drops of pyridine was added. The polymerization was continued for 12 h at 80° C. and the polymer was precipitated in excess methanol and dried to get poly[4-[(4-cardanyl)azo]benzoic acid] with an yield of 90% as red-orange powder.

EXAMPLE 4

To 5 g of monomer, 4-[(4-acryloyloxycardanyl)azo] benzoic acid dissolved in 50 ml o-dichlorobenzene, 50 mg (1 wt %) of benzoyl peroxide was added with stirring in a reaction flask which was then corked with rubber septum and purged with pure dry nitrogen gas for 30 min. The reaction mixture was heated to 85° C. on an oil bath with stirring. The polymer formed was precipitated after 12 hours of polymerization, filtered and dried to get poly [4-[(4-acryloyloxycardanyl)azo] benzoic acid] with an yield of 70% as red solid.

EXAMPLE 5

To 5 g of monomer, [4-[(4-cardanyl)azo]benzoic acid] dissolved in o-dichlorobenzene, 50 mg of boron triflouroetharate was added. The reaction was continued for 2 hours at 100° C. under nitrogen atmosphere on an oil bath. The polymer was precipitated in excess carbon tetrachloride, filtered and washed thoroughly with chloroform and dried at 80° C. for 12 h in a vacuum oven to get the cationic polymer of [4-[(4-cardanyl)azo]benzoic acid] with an yield of 80% as dark red solid.

EXAMPLE 6

5 gm of the cationically prepared polymer of [4-[(4-cardanyl)azo]benzoic acid] was dissolved in tetrahydrofuran and the solvent evaporated off after casting on to a glass of 30 cm length and 10 cm width. The solvent was evaporated off by exposing the glass plate in a vacuum oven and the temperature raised to 150° C. and annealed at this temperature for 1 hour to get a transparent film.

EXAMPLE 7

3 gms of the cationically prepared polymer of [4-[(4-cardanyl)azo]benzoic acid] was dissolved in tetrahydrofuran and the solvent evaporated off after casting on to a glass of 20 cm length and 10 cm width. The solvent was evaporated off by exposing the glass plate in a vacuum oven and the temperature raised to 150° C. and annealed at this temperature for 1 hour to get a transparent film.

EXAMPLE 8

To 10 g of 4-[(4-acryloyloxycardanyl)azo]benzoic acid and methyl methacrylate dissolved in 100 ml o-dichlorobenzene, 100 mg of benzoyl peroxide was added with stirring in a reaction flask which was then corked with rubber septum and purged with pure dry nitrogen gas for 30 min. The reaction mixture was heated to 85° C. on an oil bath with stirring. The copolymer polymer formed was precipitated after 12 hours of polymerization, filtered and dried to get copolymers of poly[4-[(4-acryloyloxycardanyl)azo]benzoic acid] with methyl methacrylate having an yield of 68%.

EXAMPLE 9

5 gms of poly[4-[(4-acryloyloxycardanyl)azo]benzoic acid] were taken in a crucible and heated at a controlled rate of 5–10° C. per minute a temperature of 150–180° C. and annealed at a temperature of 150–180° C. for 1–2 hours to get fully cross linked polymers.

EXAMPLE 10

To 8 g of 4-[(4-acryloyloxycardanyl)azo]benzoic acid and methyl acrylate dissolved in 100 mL o-dichlorobenzene, 0 mg of benzoyl peroxide was added with stirring in a reaction flask which was then corked with rubber septum and purged with pure dry nitrogen gas for 30 min. The reaction mixture was heated to 85° C. on an oil bath with stirring. The copolymer polymer formed was precipitated after 12 hours of polymerization, filtered and dried to get copolymers of poly[4-[(4-acryloyloxycardanyl)azo]benzoic acid] with methyl acrylate having an yield of 68%.

We claim:

1. A process for the preparation of poly4-[(4-cardanyl)azo]benzoic acid comprising subjecting 4-[(4-cardanyl)azo]benzoic acid to polymerisation by any known polycondensation technique using thionyl chloride and pyridine.

2. A process for the preparation of poly4-[(4-acryloylcardanyl)azo]benzoic acid comprising subjecting 4-[(4-acryloylcardanyl)azo]benzoic acid to polymerisation by any known free radical polymerisation technique.

3. A process for the preparation of the cationic polymer of formula V of 4-[(4-cardanyl)azo]benzoic acid comprising subjecting the monomer to polymerisation by cationic mechanism in the presence of borontrifluoroetherate in dichloroethane at 100° C. to obtain the said cationic polymer polymerised through the side chain unsaturation.

4. A process as for the preparation of 4-[(4-cardanyl)azo]benzoic acid and 4-[(4acryloylcardanyl)azo]benzoic acid and their polymers poly 4-[(4-cardanyl)azo] benzoic acid and poly4-[(4-acryloylcardanyl)azo] benzoic acid comprising a process for the cationic polymerisation of 4-[(4-cardanyl)azo]benzoic acid comprising (a) diazotising p-amino benzoic acid by known methods, adding a solution of cardanol in an organic solvent drop wise to the diazonium salt solution and crystallising it from an organic solvent, polymerising the novel monomer 4-[(4-cardanyl)azo] benzoic acid thus obtained by known polycondensation technique using thionyl chloride and pyridine to give poly4-[(4-cardanyl)azo]benzoic acid, (b) reacting 4-[(4-cardanyl)azo]benzoic acid with acryloyl chloride to get the acrylic derivative 4-[(4acryloylcardanyl)azo]benzoic acid, (c) polymerising said acryloyl derivative by known free radical polymerisation technique to give poly4-[(4-acryloylcardanyl)azo]benzoic acid or (d) polymerising 4-[(4-cardanyl)azo] benzoic acid by cationic mechanism using borontrifluoroetherate in dichloroethane at 100° C. to get the cationic polymer of 4-[(4-cardanyl)azo]benzoic acid polymerised through the side chain unsaturation (e) and if desired converting the polymers obtained above to cross linked polymer films with azobenzene mesogens in network structures by cross linking the polymers under controlled heating at a rate of 5–10° C. per minute to a temperature of 150–180° C. and annealing at this temperature for 1–2 hours and (f) dissolving the polymer in solvents selected from tetrahydrofuran, dimethyl acetamide, dimethyl formamide and evaporating the solvent off by exposing the glass plate in a vacuum oven and raising the temperature to 150–180° C. and annealing at this temperature for 1–1½ hours whereby cross linked films exhibiting liquid crystalline phase behaviour.

* * * * *